Figure 1:
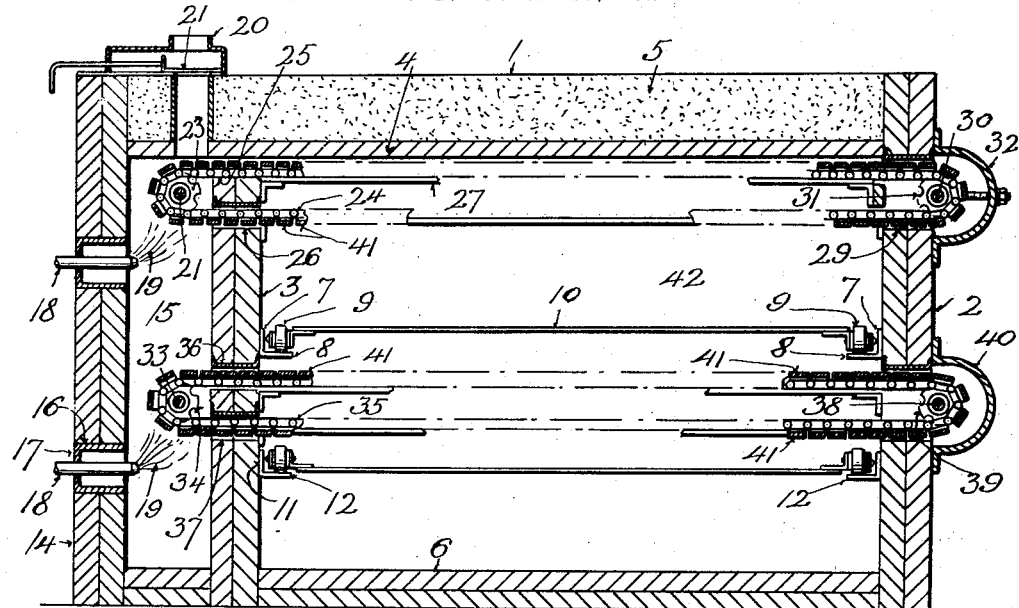

June 23, 1931.  I. ELLIOTT  1,811,822
BAKING OVEN AND METHOD OF HEATING THE SAME
Filed March 12, 1929

INVENTOR
Irwin Elliott
BY Charles G. Hensley,
ATTORNEY

Patented June 23, 1931

1,811,822

UNITED STATES PATENT OFFICE

IRWIN ELLIOTT, OF BRONX, NEW YORK, ASSIGNOR TO UNIVERSAL OVEN COMPANY, INC., OF NEW YORK, N. Y., A CORPORATION OF NEW YORK

BAKING OVEN AND METHOD OF HEATING THE SAME

Application filed March 12, 1929. Serial No. 346,452.

My invention relates to a novel baking oven and to a method of applying heat indirectly to the baking chamber of the oven. In some types of ovens for baking food products it is desirable to apply the heat indirectly to the baking chamber in order that the products of combustion from the source of heat shall not come into direct contact with the articles which are being baked. Heretofore, baking ovens have been made either to be heated by the direct application of the products of combustion to the heating chamber, or, in indirect types, the heat has been conducted through a wall or plate; and in some instances both systems have been combined. The present invention relates to the type of oven in which some or all of the heat is applied indirectly to the baking chamber in order that the products of combustion shall not come into direct contact with the articles which are being baked. But instead of applying the heat by conduction through a wall or plate I provide one or more traveling conveyors having members which are heated outside of the baking chamber by the source of heat, and the conveyor or conveyors are moved so that the several elements which temporarily receive the heat from the source will give off or deliver up their heat while passing into or through the baking chamber.

In addition to the advantage of being able to keep the products of combustion out of direct contact with the product, there is the additional advantage that the heat may be more evenly distributed throughout the baking chamber than where the heat is applied to and conducted through a stationary wall separating the source of heat from the baking chamber in previous devices. The present invention both as to the structure and the method are applicable to different forms of ovens including what is known as a traveling oven, through which the products to be baked are conveyed on a movable conveyor, as well as to the type of oven in which the product remains stationary during the baking process. By way of example I have shown my invention embodied in both types of ovens.

Figure 2:
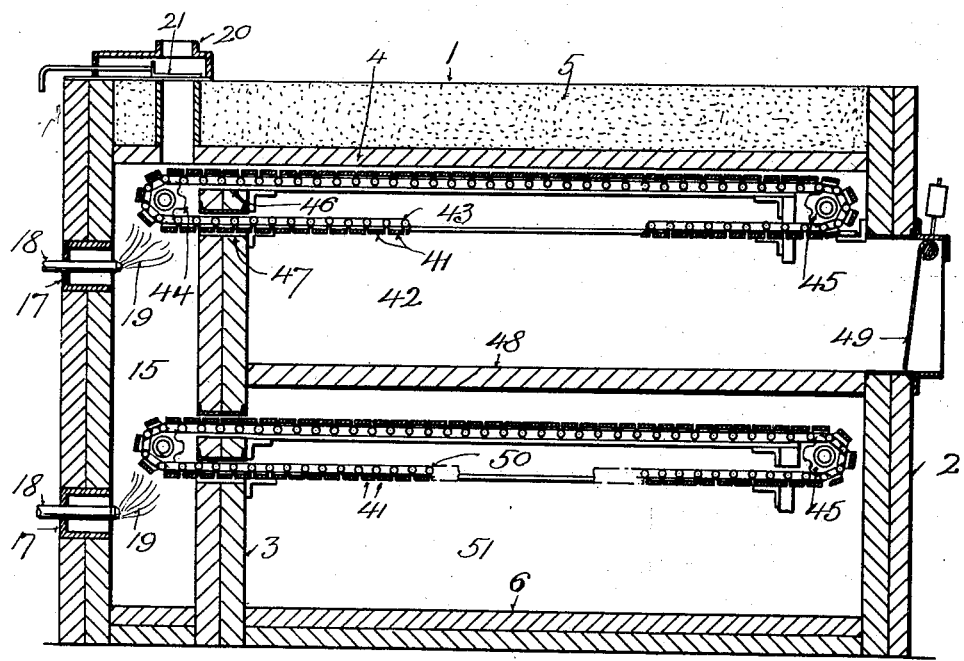

In the drawings forming part of this application,

Figure 1 is a cross sectional view through a baking oven embodying my invention in the form of a traveling oven, and Figure 2 is a similar view of the invention applied to a stationary oven.

In Figure 1 of the drawings I have shown my invention applied to what is commonly called a traveling oven or one in which the articles to be baked are conducted through the baking chamber on a movable conveyor. I have shown only such parts of the complete oven as may be necessary to illustrate the application of the present invention, but it is to be understood that the usual appurtenances of a baking oven may be used in conjunction with the parts illustrated and it is also to be understood that the invention may be applied to ovens of various shapes and construction. By way of illustration I have shown an oven 1 having a baking chamber 2 through which the product travels and in which it is baked.

This baking chamber is defined on one side by upright walls 2 of sufficient thickness to retain the heat within the baking chamber. At the opposite side of the baking chamber there is shown a double wall 3. The top of the chamber is defined by a wall 4 which is protected against rapid radiation by a filler of insulating material 5. The bottom is closed by the bottom wall 6 which is shown of double thickness for insulating purposes. Mounted on the inner sides of the two side walls there are upper parallel tracks 7 consisting of L beams mounted on the side walls and each having a flange 8 directed horizontally to provide tracks on which the rollers 9 of the conveyor 10 travel. The conveyor, which serves as a moving support for the articles to be baked, may be any of the ordinary types of conveyors now in general use. As these conveyors are generally of endless form it is customary to provide another set of tracks for the lower or return run to travel upon and for this purpose I have shown L beams 11 mounted on the side walls of the oven some distance below the beams 7 and these have horizontally extending flanges 12 which provide parallel tracks on which the rollers 9 of the lower run of the conveyor are adapted to travel.

I have shown an extension of the oven structure formed by an extension of the top wall 4 beyond the side wall 3, an extension bottom wall 13 outside of the end wall 3 and the end wall 14 spaced from the end wall 3 of the baking chamber, so that these several walls, in conjunction with the end wall 3 of the baking chamber form a combustion compartment 15. The wall 14 is provided with lateral apertures 16 having lining members 17 through which project the burner nozzles 18.

It will be understood that any source of heat may be employed for heating the baking chamber, although the principal purpose of the present invention is to keep the products of combustion from this chamber, and it is therefore used where fuel is consumed in the combustion chamber. In illustrating the burners 18, however, I do not wish to be understood as limiting my invention to an apparatus in which oil or gas only is used as fuel. The fuel supplied by these burners is burned at the end of the nozzles as shown at 19 within the combustion chamber. As this combustion chamber is separated from the baking chamber by the wall 3 the products of combustion resulting from the flames 19, after rising in the combustion chamber, pass off through the discharge flue 20 which is controlled by a damper 21 and from there the same may discharge into any suitable stack or chimney, (not shown).

In the construction shown in Figure 1, I have illustrated an upper and a lower heat distributor in order to apply the top heat and the bottom heat in the baking chamber, but the devices for distributing the heat in both instances are alike. I have shown a shaft 22 extending across the combustion chamber and this shaft, which will project through the end of the oven, may be driven by any source of power and as it is to be revolved at a very low speed the power required for this purpose is very small. On this shaft there is arranged a sprocket 23 around which travels the endless chain 24 the upper run of which travels through a slot or opening 25 in the wall 3 of the oven. The lower run travels through a lined opening 26 below the opening 25 so that the openings in the end wall 3 are just sufficient to allow the two runs of the chain and the members carried thereby to travel through the wall without permitting substantial flow of the products of combustion from the combustion chamber into the baking chamber.

I have shown a plate 27 supported on brackets 28 which are attached to the walls 3 an 2 for the purpose of supporting the upper run of the traveling chain. At the opposite side of the oven the side wall 2 is also provided with a lined opening 29 sufficient to permit travel of both the upper and lower runs of the chain. At this side of the apparatus there is arranged a shaft 30 which is provided with a sprocket 31 around which the chain 24 engages and this sprocket merely acts as an idler to guide the chain, in the event that the power for driving the chain is applied to the shaft 21. There is a metal cap 32 attached to the outer side of the wall 2 of the oven to form an enclosure for the sprocket 31 and the portion of the chain which engages around it, to prevent the escape of heat from the baking chamber through the aperture 29 in which the chain travels.

I have provided a shaft 33 at a lower level in the combustion chamber and corresponding to the shaft 21 and driven by any suitable source of power like the shaft 21. This shaft also has a sprocket 34 around which travels the endless chain 35 and the upper run of this chain travels through the lined opening 36 of the side wall 3 while the lower run travels through the lower aperture 37. At the opposite side of the oven there is a shaft 38 having a sprocket 39 corresponding with the shaft 30 and sprocket 31; and there is an opening 39 in the side wall 2 to permit the runs of the chain 35 to travel therethrough. A cap 40 similar to the cap 32 is also attached to the outer side of the wall 2 to prevent the escape of heat through the opening 39.

Both the upper and lower chains 24, 35 are provided with cross members 41 which articulate with the individual links of the chains, and these members may be made of any material which will temporarily receive the heat from the flames and afterwards give up the heat by radiation and conduction within the baking chamber. I have found that cast iron is a very suitable material of which to make these members. Both the upper and lower chains are provided with these members so that they form a substantially continuous body in the straight runs of the chains and separate laterally or open while traveling around the end sprockets 23, 34, as shown in Figure 1 so that the heat from the flames will strike around these members.

The flame from the lower burner 18 is projected against the conducting members 41 of the lower chain 35 and in like manner the flames from the upper burner 18 are projected against the members 41 of the upper chain 24. The members 41 are, therefore, heated while passing through and in proximity to the flames from the burners in the combustion chamber and the heat received and temporarily absorbed by these members is carried by them into the baking chamber 42 and while passing across the chamber and back again to the combustion chamber these members 41 are gradually releasing the heat stored in them, to the air in the baking chamber and this operation goes on continuously while the apparatus is in operation. The members 41 of the upper chain thus conduct heat to and discharge it in the upper portion of the baking chamber while the members 41 on the lower chain supply heat to the lower portion of the baking chamber or below the path of the product which is traveling on the upper run of the conveyor 10.

In this manner the heat supplied by the flames from the burners in the combustion chamber is continuously heating the members 41 and these are continuously moving into and through the baking chamber and delivering the heat thereto which has been previously applied to them while temporarily traveling through the combustion chamber. The wall 3 which divides the baking chamber from the combustion chamber segregates these two chambers so that the products of combustion do not flow into the baking chamber. It will be understood that any number of these movable heat conductors with a suitable number of flames may be employed, according to the size and capacity of the baking chamber.

In Figure 2 I have shown the device applied to a baking oven in which the products remain stationary on the hearth during the baking operation, instead of being propelled through the oven on a conveyor. In this construction the upper chain 43 corresponds with the chain 24 in the first described construction and it passes around a sprocket 44 in the combustion chamber and over an idler sprocket 45 which in this case is arranged inside and adjacent the side wall 2 of the oven. The chain 43 travels through openings 46, 47 in the dividing wall, the same as in the previous construction. The hearth shown at 48 is adapted to receive the products to be baked thereon which latter are inserted through the swinging door 49, the articles being placed upon the hearth to remain until the baking operation has been completed. The upper heat is conducted to the baking chamber 42 over the hearth by the upper chain 43 and its heat conducting members 41.

The lower chain 50 with its heat conducting members 41 is arranged to travel through a chamber 51 which is formed below the hearth 48 so that the heat given up by this conductor supplies the bottom heat for the baking operation. In other respects the apparatus is the same as shown in Figure 1.

From the above it will be apparent that I have provided a simple and effective apparatus for receiving the heat from the source such as gas burners which are segregated from the baking chamber and which means will, while traveling across the oven, furnish either top or bottom heat, or both, to the baking chamber, so that the chamber is effectively heated in a simple manner and without having the products of combustion come into direct contact with the product which is undergoing the baking operation.

Having described my invention, what I claim is:

1. A method of applying the principal heat for baking to a baking oven which consists of applying heat directly to traveling members capable of temporarily absorbing heat outside of the baking chamber of said oven and in moving said members into and through the baking chamber of the oven to cause them to give up the stored heat while passing through the baking chamber and supply the principal baking heat to said baking chamber.

2. A baking oven comprising a structure forming a baking chamber and a combustion chamber, said baking chamber having a hearth to support the products to be baked, movable means disposed above and below said hearth and having members to receive heat, heating means in said combustion chamber for heating said members while they are traveling in said combustion chamber, said heating members being adapted to release their heat in the baking chamber above and below said hearth while traveling in the baking chamber.

3. A baking oven comprising a structure forming a baking chamber and a combustion chamber with an apertured wall between said chambers, a hearth in said baking chamber, endless members passing through said apertured wall and traveling in both said combustion and said baking chambers, and arranged above and below said hearth, heat receiving members carried by said endless members, and heating means for applying heat to said members while they are traveling in said combustion chamber.

4. A baking oven comprising a structure forming a baking chamber and a combustion chamber with a communicating passage between them, a movable hearth for transporting the products to be baked longitudinally through said baking chamber, endless, movable members arranged horizontally above and below said traveling hearth and having heat receiving members, and a source of heat in said combustion chamber for heating said heat receiving members while they are traveling in said combustion chamber, said heating members being adapted to release heat in said combustion chamber while traveling therein both above and below said movable hearth.

5. A baking oven comprising a structure forming a baking chamber, a source of heat disposed outside of said baking chamber and travelling means adapted to be heated by said external source of heat and including members capable of temporarily absorbing heat, said travelling means being arranged to travel through a portion of said baking chamber and adapted to give up its stored heat while passing through the baking chamber and thereby supply the principal heat to said baking chamber.

6. A baking oven comprising a structure forming a baking chamber and a combustion chamber with an apertured wall separating said baking and said combustion chambers, a source of heat disposed in said combustion chamber and travelling means movable through the aperture of said separating wall and adapted to travel through a portion of said baking chamber, said travelling means having members capable of temporarily absorbing heat applied thereto by said source of heat in the combustion chamber and adapted to give up the stored heat while passing through the baking chamber to supply the principal heat for said baking chamber.

7. A baking oven comprising a structure forming a baking chamber and a combustion chamber, a source of heat disposed in said combustion chamber to produce a flame therein, endless travelling means movable through a portion of said baking chamber and into said combustion chamber and having members capable of temporarily absorbing heat applied thereto by said flame and adapted to give up the heat stored therein while said members are travelling through said combustion chamber to release the heat in said latter chamber and form the principal source of heat therein.

8. A baking oven comprising a structure forming a baking chamber and a combustion chamber with a separating wall between them, sprockets arranged respectively in said combustion and said baking chambers, an endless chain travelling over said sprockets, said separating wall having an aperture through which said chain travels, said chain being provided with members capable of temporarily absorbing heat, a source of heat in said combustion chamber adapted to produce a flame and arranged whereby the flame will impinge on said heat absorbing members while the latter are passing around the sprocket in the combustion chamber, said heat absorbing members being adapted to release their heat in said baking chamber while travelling through the latter to constitute the principal source of heat for said baking chamber.

Signed in the city, county of State of New York, the 8th day of March, 1929.

IRWIN ELLIOTT.